United States Patent [19]

Fuller

[11] Patent Number: 5,069,303
[45] Date of Patent: Dec. 3, 1991

[54] HIGH PERFORMANCE MOTORCYCLE STEERING MECHANISM

[76] Inventor: Robert B. Fuller, Box 8, Wilson, Wyo. 83014

[21] Appl. No.: 373,892

[22] Filed: Jun. 29, 1989

[51] Int. Cl.[5] .............................................. B62K 21/00
[52] U.S. Cl. ................................... 180/219; 180/227; 280/276
[58] Field of Search ................ 180/219, 227; 280/267, 280/268, 269, 276, 277, 270, 274

[56] References Cited

U.S. PATENT DOCUMENTS

| 4,139,072 | 2/1979 | Dawson | 180/219 |
| 4,157,739 | 6/1979 | Frye | 280/269 |
| 4,408,776 | 10/1983 | Randolph et al. | 280/274 |
| 4,721,179 | 1/1988 | Yamaguchi et al. | 180/219 |
| 4,776,609 | 10/1988 | Pan et al. | 280/276 |

FOREIGN PATENT DOCUMENTS

| 92093 | 4/1923 | Austria | 280/270 |
| 205134 | 10/1923 | United Kingdom | 280/276 |

Primary Examiner—David M. Mitchell
Attorney, Agent, or Firm—Andrew D. Maslow

[57] ABSTRACT

A motorcycle with an improved steering mechanism is provided. The motorcycle is provided with a swing arm which is moveably attached to a tracking mechanism. The tracking mechanism is an arcuate track which is attached directly to the frame or engine of the motorcycle. When the front wheel is steered about its steering axis, the swing arm moves along the arc of the arcuate tracking mechanism.

2 Claims, 4 Drawing Sheets

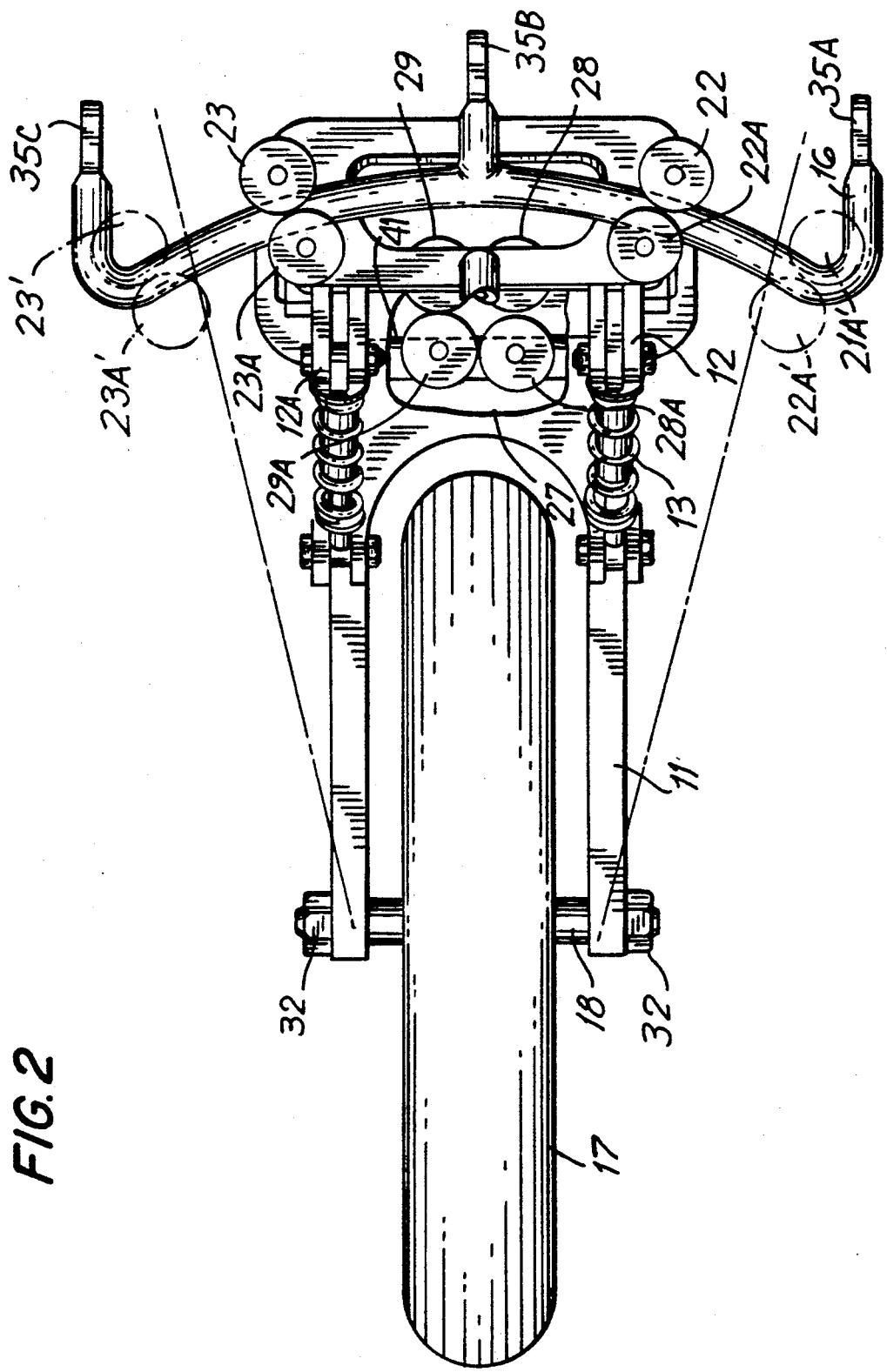

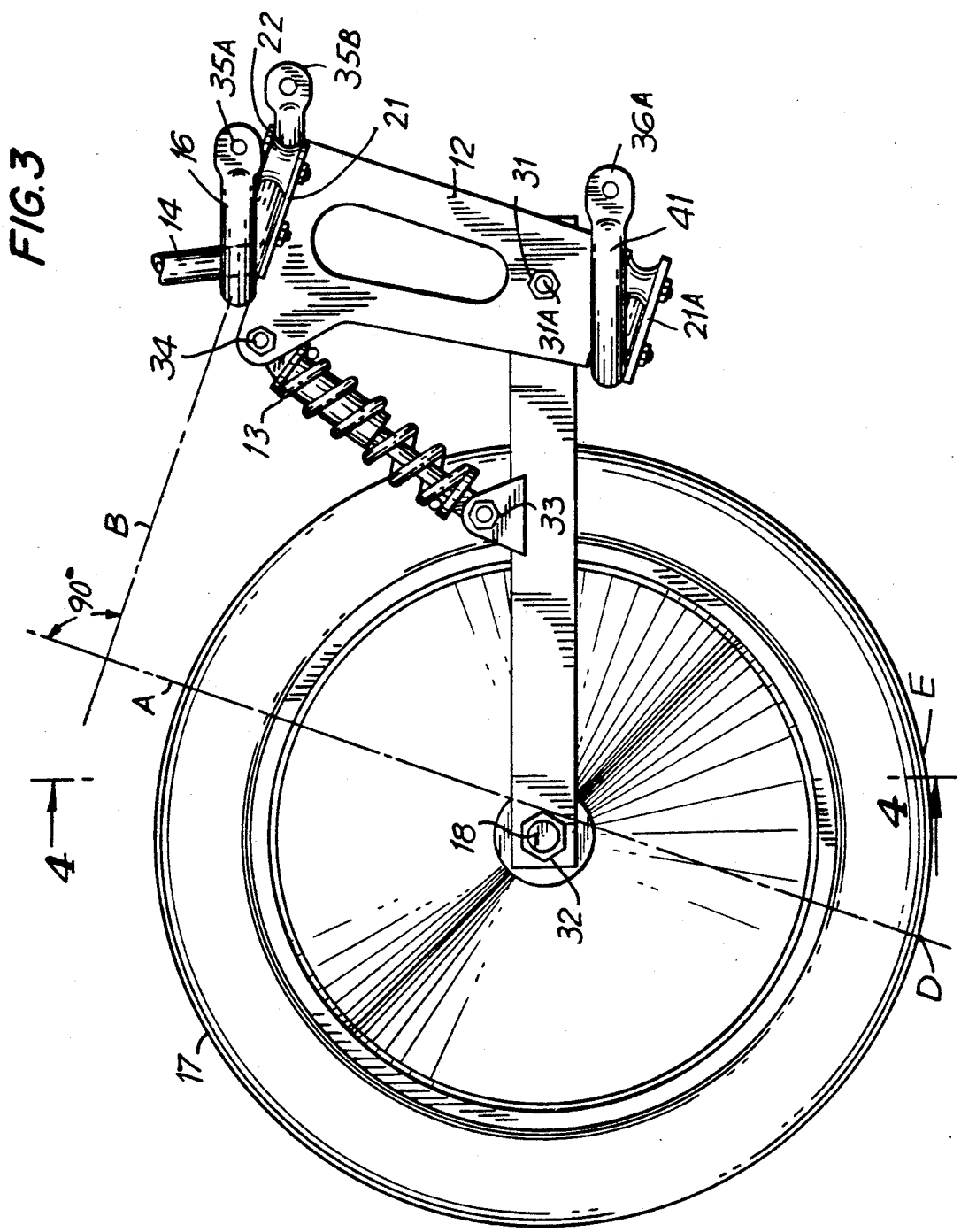

HIGH PERFORMANCE MOTORCYCLE STEERING MECHANISM

FIELD OF THE INVENTION

This invention relates to an improved steering mechanism useful for high performance motorcycles. More specifically, the invention provides an improved front suspension and steering mechanism which is an alternative to the telescoping front fork.

BACKGROUND OF THE INVENTION

Initially motorcycles used the bicycle's simple steered fork, a system which carries the wheels between the "tines" of the fork, whose "handle" pivots in steering bearings above the tire. The axis of these steering bearings, if projected downward, hits the road ahead of the point at which the tire touches the road. Like a furniture caster, the rolling tire then naturally tends to trail back into line behind the steering axis if deflected.

The important variable in this caster effect, called trail, is measured on the road surface as the distance between the tire contact point forward to the projection of the steering axis. The steering axis may pass through the axle centerline or it may not. If it doesn't, the distance between the two is called offset. The steering axis is inclined backward at an angle called rake, and acting with the trail and the weight of the front tire allows the front wheel to fall naturally to the steering angle that will make the motorcycle hold its line.

A change in one variable effects all the others. Rake and trail geometry are interrelated. If one increases the rake, the trail increases with it. Trail strongly influences the stability of the motorcycle. More trail makes steering harder to deflect and yields increased high-speed stability but heavier steering. Reducing trail lessens the self-stabilizing effects but also lightens the steering and increases responsiveness to the riders input.

The balancing of rake, trail and offset is necessary for an engineer to design the specific handling characteristics desired for the motorcycle. The range of adjustments is fairly large with a telescoping steering mechanism.

However, steering mechanisms utilizing a telescoping front fork suspension have several limitations inherent in their design, especially when they are used on a high performance motorcycle. One limitation is the tendency for the telescoping front fork to compress under sudden hard braking. This compression reduces the available suspension travel thereby making the suspension less effective.

Another problem caused by hard braking is that the compression of the suspension shortens the effective wheelbase of the motorcycle.

Yet another inherent design limitation with the telescoping front fork is that they are mounted to the frame of the motorcycle at a point far from the point of contact of the tire with the road. The mounting usually consists of at least one bearing and, due to the great distance from the point of contact of the tire with the road, a large amount of leveraged force is applied to the bearings. This makes it necessary to increase the strength of the frame in the area where the telescoping fork is mounted to it. These problems caused by the compression of hard breaking and the large amount of force being applied to the area of mounting to the frame, are exacerbated by the newly developed tires having increased adhesion to the road surface.

In the prior art the most common solution to the above problems is the use of hub centered steering. Difazio hub steering is one example. In this mechanism the wheel rotates around a large hub, usually at least six inches in diameter, on a large bearing along the circumference of the hub. Steering is accomplished about the axis of a kingpin, or two ball joints, which are mounted inside the hub. One or two swing arms are provided which are attached to the hub at one end and extend backward toward the frame or engine and are pivotably attached thereto at the other end. The swing arms are usually parallel to the road surface and one end of the suspension system is attached to the swing arm. The other end of the suspension system is attached to the frame of the motorcycle. Because steering is accomplished about the kingpin, hub centered steering has the disadvantage of being limited in the amount of trail or caster that can be accomplished without enlarging the hub even further. The invention provided herein overcomes this limitation and allows the designer of the motorcycle more freedom in the amount of trail and caster that can be built into the motorcycle.

Another steering mechanism which does not uses a telescoping fork is called an Earls Fork or leading link suspension system. This system does not solve the above problem of a large amount of leveraged force being applied to the point of mounting of the wheel to the frame and suffers a further disadvantage of being even less rigid than the telescoping fork system.

SUMMARY OF THE INVENTION

In the instant invention a motorcycle is provided with a steering mechanism which does not utilize a telescoping fork and reduces the inherent disadvantages of the telescoping fork steering mechanism. The wheel to be steered is provided with rotation means, such as an axle, for rotating the wheel as it travels along the road surface. A moveable arm is fixed to the rotating means or axle. Tracking means is provided and is pivotably fixed to the frame or engine of the motorcycle. The moveable arm is moveable attached to the tracking means. Moving means are provided for moving the moveable arm along the tracking means.

The tracking means includes an arcuate track. The designer of the motorcycle can experiment with varying combinations of trail and caster on a telescoping fork motorcycle in order to obtain the desired performance. Once the desired performance is obtained, the designer then determines the arc of the track of the instant invention by tracing any point on the rear facing half of the front tire of the motorcycle having the desired rake, offset and trail as the wheel is rotated about its steering axis.

It is an object of the invention to provide an improved steering mechanism for a motorcycle which does not utilize a telescoping fork.

Another object of the invention is to provide a steering mechanism which includes a suspension system which minimizes compression upon hard braking.

Still another object of the invention is to provide a steering mechanism which relieves the stress placed upon the frame of the motorcycle at high speeds and sudden bumps.

Yet another object of the invention is to provide a non-telescoping fork steering mechanism which can be built for a wide range of offset and trail or caster. The invention, unlike hub centered steering, is not limited in the amount of offset by the size of the hub and can duplicate the offset and trail attainable by a telescoping fork steering mechanism.

Still another object of the invention is to provide a steering mechanism which does not require large wheel bearings as required for hub centered steering.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a top view of the front wheel and steering mechanism of the invention.

FIG. 3 is a side view of the front wheel and the steering mechanism of the invention.

DETAILED DESCRIPTION OF THE DRAWINGS

Figure 1:
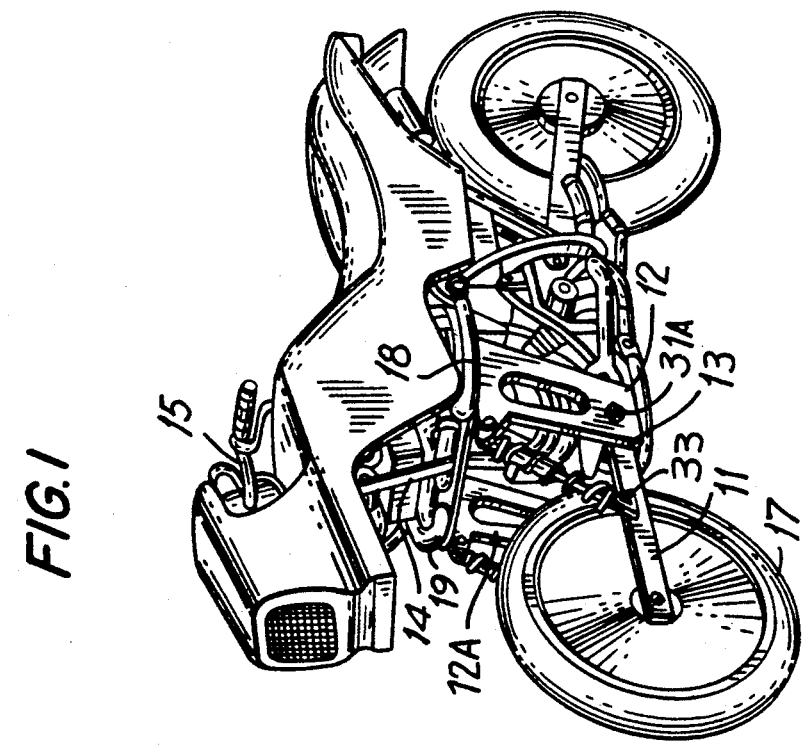
FIG. 1 is a perspective view of the motorcycle provided with the improved steering mechanism of the invention.

In FIG. 1 the entire motorcycle is shown with the improved steering mechanism. Front wheel 17 revolves around axle 18 which is fixed to swing arm 11 is pivotably attached to sideplates 12 and 12A by shaft 31A which extends through side plate 12, the swing arm 11 and then through side plate 12A. Swing arm 11 supports the front wheel and in so doing limits front wheel 17 to substantially radial motion in a vertical plane.

Figure 5:
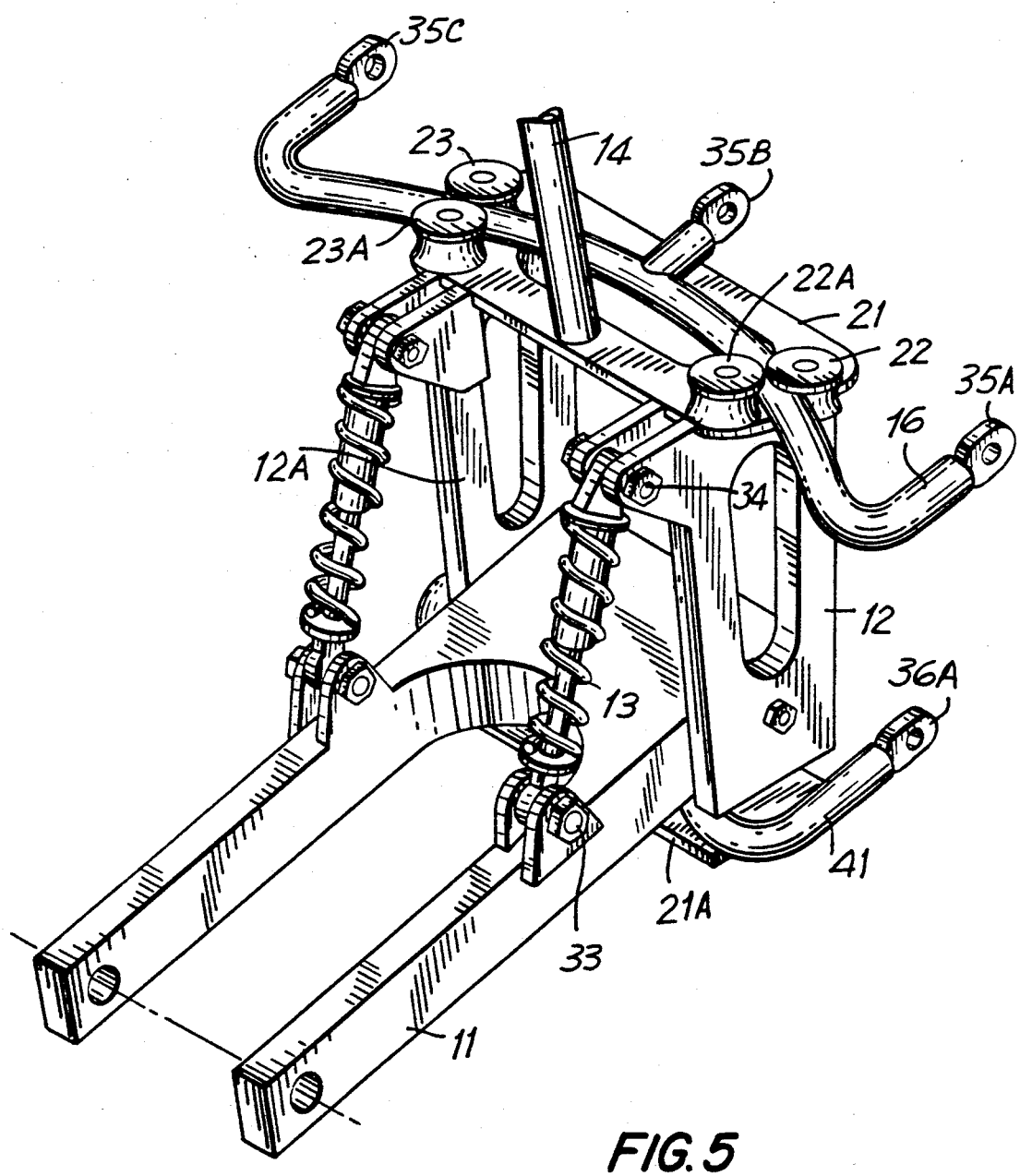
FIG. 5 is a perspective view of the steering mechanism.

As shown in FIGS. 3 and 5, one end of suspension 13 is attached to swing arm 11 at joint 33. The other end of the suspension is attached to side plate 12 at joint 34. Nut 32 is used to attach axle 18 to swing arm 11. Upper track 16 and lower track 41 are rigidly attached to the frame or engine of the motorcycle. The upper track is attached at 35A, 35B and 35C. The lower track is attached at 36A and 36B.

In FIG. 2 the arc of upper track 16 can be seen. Lower track 41 has the same arc. The arc of these tracks is important in that it determines the handling characteristics of the steering mechanism. The designer of the motorcycle may test various combinations of trail and caster on a conventional motorcycle in order to get the performance that is desired. The designer then determines the arc that is to be used for tracks 16 and 41 by tracing a point on the rearward half of the front wheel of such conventional motorcycle (having the desired trail and caster) as the front wheel is rotated about its steering axis. The steering mechanism of the instant invention will now achieve the desired trail and caster but without the inherent disadvantages of a telescoping fork steering and suspension system.

Figure 4:
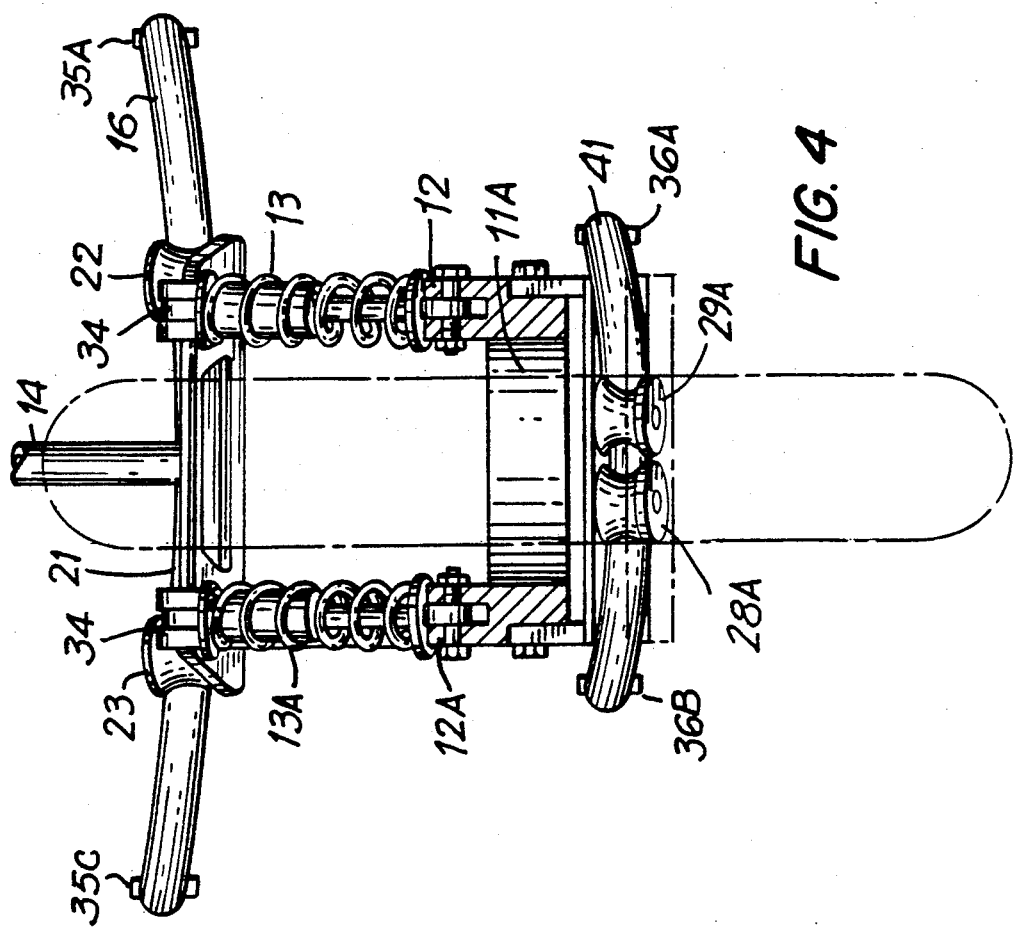
FIG. 4 is a front view of the steering mechanism of the invention with the wheel being removed and a dotted line in its place.

Side plates 12 and 12A are fixed such as by welding to upper plate 21 as shown in FIGS. 4 and 5. Lower plate 21A is similar to upper plate 21 and is likewise fixed to sideplates 12 and 12A. Roller combinations 22/22A and 23/23A are attached to upper plate 21 and are designed so that they come into contact with and roll along track 16 so that when front wheel 17 is steered about its axis the rollers move along the track to positions 23'/23A' or 22'/22A'. Similarly lower plate 21A is provided with roller combinations 28/28A and 29/29A which follow lower track 41 as shown in the cutaway section 27 of FIG. 2 and also in FIG. 4. Swing arm 11 may be a unitary U-shaped bar, the back of which is indicated as 11A in FIG. 4.

It can be seen that upper plate 21, side plates 12 and 12A and lower plate 21A form a fixed box which moves along fixed tracks 16 and 41. The upper, lower and side plates can be welded together so that they are unitary. The front wheel now may be steered by a direct connection to this box. As shown in the drawings steering bar 14 is attached to upper plate 21 at one end and to handlebar 15 at the other end. However the steering bar may be attached to any portion of the above mentioned box. An aspect of the invention is that the steering mechanism does not serve to support the front wheel on the frame as in a conventional motorcycle.

In FIG. 3 it can be seen that the wheel 17 touches the road at the intersection of vertical line 4—4 and the lower portion of the wheel. The axis of steering is shown at line "A" and upper and lower plates 21 and 21A lie in planes perpendicular to axis A. The distance between point D, (the intersection of the steering axis with the road) and point E (the point of contact of the tire with the road) is the trail. The distance between the point of contact with the road of a vertical line drawn through the axle 18 and point D is the offset. In FIG. 3 the steering axis is about 27 degrees from the vertical and this angle is the rake.

It should now be evident that the invention provides a means for adjusting the steering handling characteristics of a motorcycle provided with a swing arm but without being severely limited in the amount of trail or caster that can be built as in the case of Difazio steering where the trail and caster are limited by the size of the hub. The inherent design limitations of the telescoping fork steering mechanism are also overcome by the instant invention It will thus be seen that the objects set forth above, among those made apparent from the preceding description, are efficiently attained and, since certain changes may be made in carrying out the above steering mechanism without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

What is claimed is:

1. A motorcycle with an improved steering mechanism comprising a frame, an engine, a front wheel, a moveable swing arm attached to the front wheel and supporting it in an upright position, means for rotating the wheel about a steering axis to steer the wheel, arcuate tracking means defining an arc and attached to the frame or engine, wherein the swing arm is movably attached to the tracking means so that when the wheel is steered the swing arm moves along the arc of the arcuate tracking means, a suspension system attached to said swing arm, said suspension system having a first and second end, a side plate pivotally attached to the swing arm, the suspension system being attached at its first end to the side plate and at the second end to the swing arm, a first plate attached to the side plate, moving means attached to the first plate so that the moving means of the first plate come into contact with the arcuate tracking means and move along the arc of the arcuate tracking means.

2. The motorcycle of claim 1 wherein the arcuate tracking means comprises an upper and lower arcuate tracking means, said first plate being attached to the upper portion of the side plate, and further comprising; a second side plate, a lower plate and lower moving means, the lower plate being attached to the respective lower portions of the side plate and the second side plate, said lower moving means being attached to the second plate so that the lower moving means comes into contact with the arcuate lower tracking means and moves along the arc of the lower arcuate tracking means, said first plate, side plate, lower plate and second side plate being fixed to form a unitary box.

* * * * *